Patented Mar. 5, 1935

1,993,663

UNITED STATES PATENT OFFICE 1,993,663

PREPARATION OF PHENYL MERCAPTANS AND INTERMEDIATES THEREFOR

Emeric Havas, South Milwaukee, Wis., assignor to E. I. du Pont de Nemours & Company, Wilmington, Del., a corporation of Delaware No Drawing. Application August 11, 1933, Serial No. 684,753

11 Claims. (Cl. 260—158)

This invention relates to the preparation of new intermediates for vat dyestuffs and more particularly to the preparation of the aluminum compounds of the sulfinic acids of the benzene series and the conversion of these compounds to the corresponding phenyl mercaptans, which in turn are readily converted into thioglycolic acids.

Phenyl thioglycolic acids, particularly those containing halogen and/or alkyl groups on the benzene ring, are valuable intermediates in the preparation of various thioindigoid colors. Heretofore, these compounds have been prepared from the corresponding amino derivatives by what is usually termed the xanthate method, in which the xanthogenic esters which are first formed are saponified to the mercaptans and these mercaptans condensed with chloroacetic acid. The yield from this process is low and the product very impure. A more recent process for preparing these compounds outlined in U. S. Patent 1,832,209 comprises the treating of the halogen alkyl benzenes with chlorosulfonic acids, reducing the sulfochloride compounds so formed to the corresponding mercaptans and then condensing the mercaptans with chloroacetic acid. This latter process, however, involves the use of comparatively large amounts of chlorosulfonic acid in preparing the benzenesulfochloride and a large amount of reducing agent in converting it to the mercaptan.

It is the object of this invention to prepare the mercaptans of benzene or halogen and/or alkyl substituted benzene by a more economical method than heretofore used and to produce these compounds in high yield and with good purity.

It is a further object of my invention to produce new aluminum chloride compounds of the sulfinic acids of halogen and/or methyl substituted benzene which are particularly valuable as intermediates in the production of thioindigoid colors.

Knoevenagel in Berichte 41, pages 3315-3331 describes the preparation of the sulfinic acids of benzene and various substituted benzenes by treating them with aluminum chloride and sulfur dioxide, thus forming the aluminum compound of the sulfinic acids, which is then treated with alkaline reagents to remove the aluminum and to give the alkali salts of the sulfinic acids. The aluminum is converted by this treatment to its hydroxide, the separation of which is a tedious operation. The alkali sulfinate must then be reduced to the mercaptan prior to its conversion into the phenylthioglycolic acid. He corroborates the statement of Friedel that by the usual acid decomposition of the aluminum compound very little of the sulfinic acid can be isolated since at low temperatures the aluminum compound is not attacked and at high temperatures the sulfinic acid is decomposed, (Berichte 41, page 3316).

I have found that the compound resulting from the treatment of these substituted benzenes with aluminum chloride and sulfur dioxide can be decomposed and reduced simultaneously by treating the same with zinc dust and an acid to form the mercaptan of the starting material in high yield and of excellent purity.

To more fully illustrate my invention the following examples are given in which parts by weight are used.

*Example 1.*—Preparation of 1.4 dimethyl-2-chlorobenzene-5-thioglycolic acid. 140 parts of chloro-p-xylene are mixed with 560 parts of carbon disulfide, 160 parts of dry aluminum chloride are added with stirring, cooled to 0° C. and the theoretical amount of sulfur dioxide introduced at 0 to 5° C. The reaction is complete when no more hydrochloric acid is evolved. After standing a few hours at 0–5° C., water is added, the carbon disulfide distilled off with steam and the mass cooled and filtered.

The filter cake of the aluminum chloride addition product thus obtained is stirred with 500 parts of commercial hydrochloric acid, 20° Bé., warmed and at the same time 130 parts of zinc dust are added. As soon as the reaction starts, external heating is discontinued; the mass is permitted to warm up to the boiling point and is held at that temperature until all of the zinc is used up. After cooling, the 1.4 dimethyl-2-chlorobenzene-5-mercaptan separates as a crystalline mass, which is isolated by filtration and washed with a small amount of water; it is used as thus obtained in the preparation of the thioglycolic acid, or if desired it may be purified by steam distillation.

The mercaptan, as obtained above without purification, is dissolved in 800 parts of a 5% caustic soda solution and at room temperature a solution of 130 parts of chloroacetic acid, which has previously been neutralized with caustic soda, are added. The solution is slowly warmed up to about 60° C. until no more mercaptan can be detected with lead acetate solution. It is then filtered and acidified. The 1.4 dimethyl-2-chlorobenzene-5-thioglycolic acid as thus produced has a melting point of 93° C. which by recrystallization from toluene may be raised to 95° C.

*Example 2.*—Preparation of 1-methyl-3-chloro-6-thioglycolic acid. In the process above outlined 126 parts of metachloro-toluene may be substituted for the chloro-p-xylene, and with the same procedure given, 1-methyl-3-chloro-6-thioglycolic acid is obtained, melting in the crude state at 123° C. The aluminum chloride addition product obtained by reacting the m-chlorotoluene with sulfur dioxide and aluminum chloride in this example, as well as the aluminum chloride, sulfur dioxide reaction products of chloro-p-xylene of example one are both new products.

It is understood, of course, that the above examples are given merely to illustrate a particular method of carrying out my invention as required by the statutes, and that they are not to be considered in any manner as a limitation upon my invention which contemplates the decomposition of these particular aluminum chloride compounds and any of their homologues, analogues, or substitution products such as for example those disclosed by Knoevenagel in Berichte 41, pages 3315–3331. The starting materials described by Hertz et al. in U. S. Patents 1,763,556 and 1,832,209 may also be used in this process.

I have found that compounds of the formula

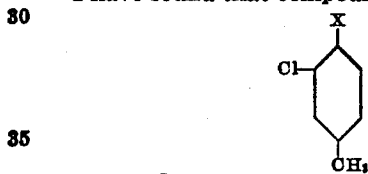

in which X represents hydrogen or a methyl group react readily with aluminum chloride and sulfur dioxide to give good yields of products substantially free from contaminating isomers. While Knoevenagel has described the preparation of aluminum chloride compounds of benzene sulfinic acids containing as substituents chlorine or methyl, the aluminum compounds of the sulfinic acids containing both chlorine and methyl groups have not been prepared heretofore.

It will be obvious to those skilled in the art that various changes may be made in the process specifically outlined above without departing from the spirit of my invention. Any inert solvent which does not react with aluminum chloride may be used in place of the carbon disulfide in forming the aluminum sulfinic acid compounds and any reducing agent which can be used in acid solution may be substituted for zinc. The hydrochloric acid may be replaced by sulfuric acid of corresponding strength and the concentration of the acid may be varied within reasonable limits so long as fairly concentrated acid is used.

This process offers the advantage that practically molecular quantities of aluminum chloride are used to form the aluminum compound, and since the sulfinic acid is in a lower state of reduction than the sulfochloride, much less reducing agent is used in converting it to the mercaptan than described in U. S. Patent 1,832,209.

What I claim is:

1. In the process for preparing phenyl mercaptans the steps which comprise reacting upon a benzene compound with aluminum chloride and sulfur dioxide at low temperatures, and treating the product so produced with a strong mineral acid in the presence of a metal or metal compound capable of liberating hydrogen from acid solution.

2. In the process for preparing phenyl mercaptans the step which comprises treating the aluminum compound of a benzene sulfinic acid with a strong mineral acid in the presence of a metal or metal compound capable of liberating hydrogen from acid solution.

3. In the process for preparing phenyl mercaptans the step which comprises treating the aluminum compound of a benzene sulfinic acid with a strong mineral acid in the presence of zinc.

4. In the process for preparing halogen-methyl- phenyl-mercaptans, the step which comprises treating the aluminum compound of a halogen-methyl-benzene-sulfinic acid with a strong mineral acid in the presence of a metal or metal compound capable of liberating hydrogen from acid solution.

5. In the production of 1.4 dimethyl-2-chloro-5-phenyl-mercaptan, the steps which comprise reacting upon chloro-p-xylene with aluminum chloride and sulfur dioxide at a low temperature, and treating the compound thus formed with a strong mineral acid in the presence of sufficient reducing agent comprising a metal or metal compound capable of liberating hydrogen from acid solution to reduce the sulfinic acid to the mercaptan.

6. In the production of 1-methyl-3-chloro-6-phenyl-mercaptan, the steps which comprise reacting upon m-chlorotoluene with aluminum chloride and sulfur dioxide at a low temperature, and treating the compound thus formed with a strong mineral acid in the presence of sufficient reducing agent comprising a metal or metal compound capable of liberating hydrogen from acid solution to reduce the sulfinic acid to the mercaptan.

7. In the production of phenylthioglycolic acids, the steps which comprise reacting upon a benzene compound with aluminum chloride and sulfur dioxide at low temperature, converting the product thus obtained to the corresponding mercaptan by treating it with a strong mineral acid and a reducing agent comprising a metal or metal compound capable of liberating hydrogen from acid solution and condensing the mercaptan with chloroacetic acid in alkaline solution.

8. The process which comprises reacting upon a compound of the formula

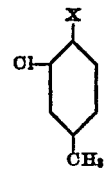

wherein X represents hydrogen or methyl, with aluminum chloride and sulfur dioxide at a low temperature.

9. As a new product, the compound obtainable by reacting upon a compound of the formula

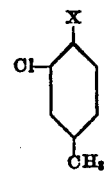

wherein X represents hydrogen or a methyl group, with aluminum chloride and sulfur dioxide at a low temperature, said compound when treated with an acid and a reducing agent being transformable into the mercaptan of the formula

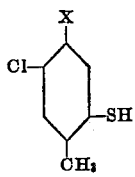

10. As a new product, the aluminum chloride compound of 1.4 dimethyl-2-chloro-benzene-5-sulfinic acid obtainable by reacting 1.4 dimethyl-2-chloro-benzene with aluminum chloride and sulfur dioxide, said compound being transformable by treatment with an acid and a reducing agent to the corresponding mercaptan.

11. As a new product, the aluminum chloride compound of 1-methyl-3-chloro-benzene-6-sulfinic acid, obtainable by reacting 1-methyl-3-chlor-benzene with aluminum chloride and sulfur dioxide, said compound being transformable to the corresponding mercaptan upon treatment with an acid and a reducing agent.

EMERIC HAVAS.